A. J. CRANE & D. J. HADLEY.
Milk-Coolers.

No. 144,835. Patented Nov. 25, 1873.

Witnesses.
E. Wolff
C. Sedgwick

Inventor.
A. J. Crane
D. J. Hadley
Per
Attorneys.

UNITED STATES PATENT OFFICE.

AUGUSTUS J. CRANE AND DENNIS J. HADLEY, OF CAMBRIDGE, VERMONT.

IMPROVEMENT IN MILK-COOLERS.

Specification forming part of Letters Patent No. 144,835, dated November 25, 1873; application filed September 6, 1873.

*To all whom it may concern:*

Figure 1:
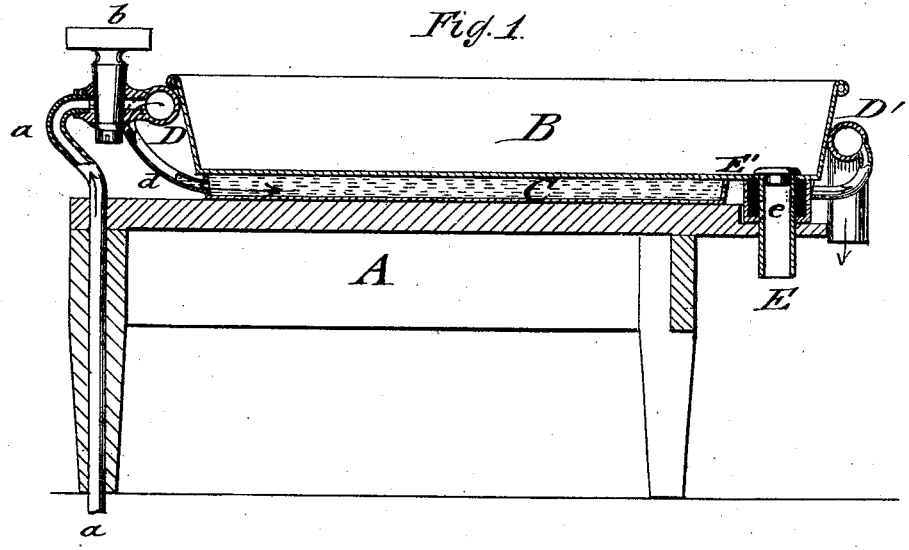
Figure 2:
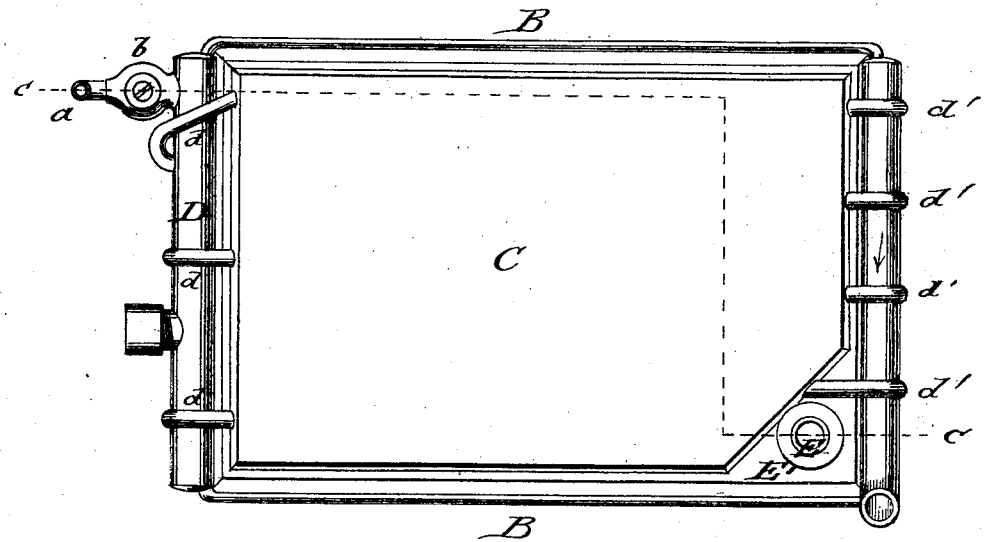

Be it known that we, AUGUSTUS J. CRANE and DENNIS J. HADLEY, of Cambridge, in the county of Lamoille and State of Vermont, have invented a new and Improved Milk-Cooler, of which the following is a specification:

In the accompanying drawing, Figure 1 represents a vertical longitudinal section of a milk-cooler on the line $c$ $c$, Fig. 2; and Fig. 2 a bottom view of the same.

Similar letters of reference indicate corresponding parts.

The object of our invention is to furnish to farmers and dairies an improved milk-cooler, by which the milk is cooled evenly without the use of tubing below the milk-pan, so that the cooling apparatus is more durable, and requires less repairs. Our invention consists in the arrangement of a sheet-metal water-chamber below the milk-pan, through which the water flows evenly, passing through inlet-pipes at one end, and outlet-pipes at the other, while the milk is drawn off by means of a sliding perforated tube of the milk-pan.

In the drawing, A represents the table on which the cooling apparatus is placed. The cooler consists of the milk-pan B, of suitable sheet metal, to which the water-chamber C is applied at the bottom, extending over the full surface of the same. It is made, preferably, of copper, of suitable height, without channels or tubes leading through the same. The water is introduced into chamber C by means of a main pipe, D, which is attached to one end of pan B, being connected, by a pipe, $a$, which passes the leg of the table A, with the conduit-pipe under the milk-room. A faucet, $b$, admits the water from pipe $a$ to main pipe D, and thence, by several downward-bent pipes, $d$, into the water-chamber C, where it spreads and produces a continuous current, which cools the milk evenly and rapidly in the pan B. The water then passes through upward-curved pipes $d'$ into the exit-pipe D', and is then carried off. The inlet-pipe D is at higher elevation than exit-pipe D', to force the water through the chamber C. The milk is drawn off through a sliding tube, E, which is, by means of a good packing, fitted nicely into tube E' at the lower side of the milk-pan B. Tube E has a broad head, which closes the opening of guide-tube E' when pressed down to the level of the bottom of the pan, and is also provided with a side aperture, $e$, through which the milk passes out on raising the tube E from below. The milk can thereby be immediately drawn off, being thoroughly cooled by the action of the fresh water on the bottom of the pan.

Having thus described our invention, we claim as new and desire to secure by Letters Patent—

1. The milk-cooler consisting of milk-pan B, with water-chamber C extending at bottom thereof, and provided with inlet-pipes D $d$ $a$, and outlet-pipes $d'$ D', and tubes E E', substantially as and for the purposes described.

2. The sliding tube E, having broad head and aperture $e$ fitted into tube E' for closing pan B and drawing off the milk from the same, substantially as set forth.

AUGUSTUS J. CRANE.
DENNIS J. HADLEY.

Witnesses:
M. V. PARKER,
E. B. WESTCOT.